Patented Nov. 8, 1949

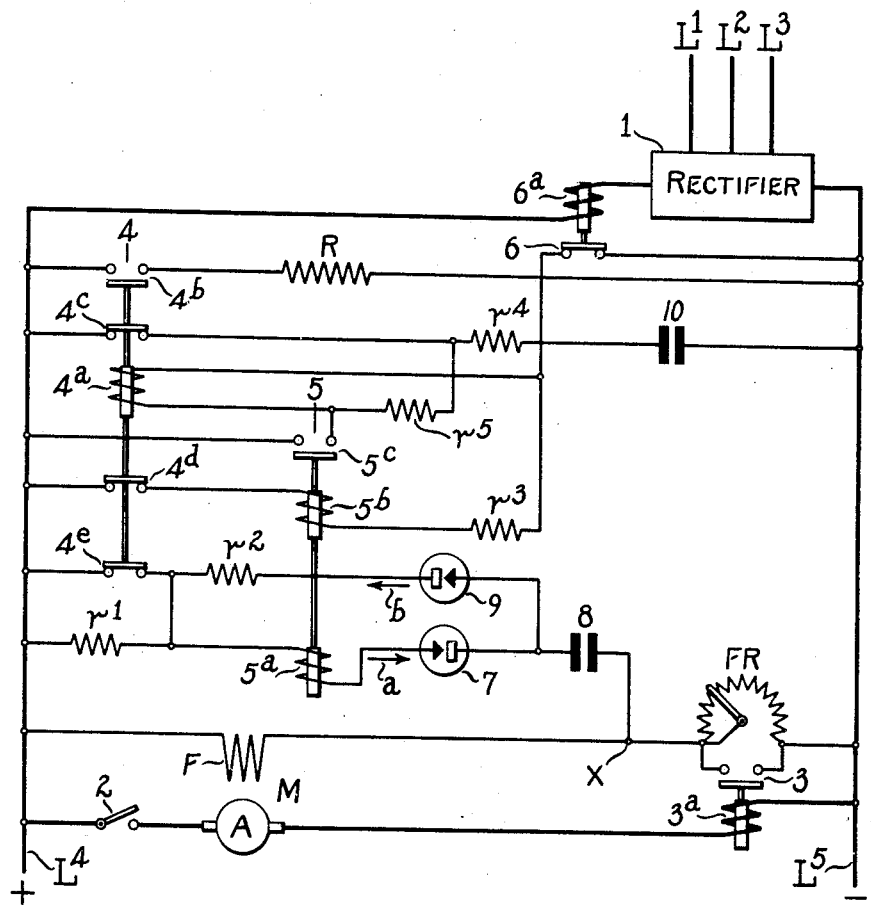

2,487,171

UNITED STATES PATENT OFFICE 2,487,171

MOTOR CONTROL SYSTEM

Robert O. Perrine, Wauwatosa, Walther Richter, Whitefish Bay, and Edwin W. Seeger, Wauwatosa, Wis., assignors to Cutler-Hammer, Inc., Milwaukee, Wis., a corporation of Delaware Application May 24, 1944, Serial No. 537,108

7 Claims. (Cl. 318—269)

This invention relates to motor control systems, and more particularly to systems of the type in which a direct current motor is supplied with current from an alternating current circuit through the medium of a rectifier.

It is desirable to provide systems of the aforesaid type with protective means for absorbing power in the direct current circuit during generative operation of the motor. Heretofore protective controls of various types have been devised for such systems which operated automatically to connect a loading resistance across the direct current circuit for absorption of the energy during generative operation of the motor. However, such controls were generally found inadequate in that the same failed to function properly under all practical operating conditions and also failed to operate without objectionable delay when generation occurred.

The present invention has among its objects to provide a protective control for systems of the aforesaid type which is simple in construction, reliable in operation, and which overcomes the aforementioned objection.

Another object is to provide a protective control of the aforesaid character which is rendered inoperative during acceleration of the motor.

Various other objects and advantages of the invention will hereinafter appear.

The accompanying drawing diagrammatically illustrates a system embodying the invention, it being understood that various modifications may be made in the system illustrated without departing from the spirit and scope of the appended claims.

Referring to the drawing, the same illustrates a system in which a direct current motor M is supplied with power from an alternating current circuit indicated by lines L¹, L², L³ through the medium of a rectifier 1. The direct current supply lines are illustrated by a positive line L⁴ and a negative line L⁵, and said motor is provided with an armature A to be connected across said supply lines by a switch 2, and a shunt field winding F which is permanently connected across said supply lines in series with an adjustable speed regulating rheostat FR. Acceleration of motor M is controlled by a normally open relay 3 which is responsive under the action of a series operating winding 3ª connected in the armature circuit of the motor to short circuit field rheostat FR.

Control means is provided for automatically connecting a loading resistance R across lines L⁴, L⁵ to absorb the energy incident to generative operation of the motor. As hereinafter set forth, such control means includes a switch 4 which is rendered operative by a relay 5 to connect resistance R across the direct current lines L⁴, L⁵ for a predetermined period upon generative operation of motor M. Also as hereinafter set forth, switch 4 is rendered inoperative during acceleration of the motor by a normally closed relay 6 having a series operating winding 6ª connected in the supply line L⁴.

More specifically, switch 4 is provided with an operating winding 4ª, a set of normally open contacts 4ᵇ for connecting resistance R across lines L⁴, L⁵ and three sets of normally closed contacts 4ᶜ, 4ᵈ and 4ᵉ. Relay 5 is provided with a pair of operating windings 5ª and 5ᵇ and a set of normally open contacts 5ᶜ for connecting the operating winding 4ª of switch 4 across lines L⁴, L⁵ through the medium of relay 6. The operating winding 5ª of relay 5 has one terminal permanently connected to line L⁴ through a resistance $r^1$ which is normally shunted by contacts 4ᵉ of switch 4 and the opposite terminal of said winding is connected in series with a rectifier 7 and a capacitor 8 to a point X between field winding F and rheostat FR. Also the operating winding 5ª and rectifier 7 are shunted by a circuit including a rectifier 9 and a resistance $r^2$. Operating winding 5ᵇ of relay 5 is normally energized, one terminal thereof being normally connected to line L⁴ by contacts 4ᵈ of switch 4, and the other terminal thereof being normally connected to line L⁵ in series with a resistance $r^3$ by relay 6. A capacitor 10 is normally connected across lines L⁴, L⁵ in series with a resistance $r^4$ by contacts 4ᶜ of switch 4 and said capacitor is also normally connected across the terminals of winding 4ª of switch 4 in series with resistance $r^4$ and a second resistance $r^5$ by relay 6.

The function and operation of the aforedescribed system will now be more fully set forth. Closure of switch 2 connects armature A across lines L⁴—L⁵ and motor M then starts with a weakened field depending upon the setting of rheostat FR. The initial inrush of current in the armature circuit which occurs upon closure of switch 2 effects response of relay 3 and field rheostat FR is thus shunted for connection of field winding F directly across the supply lines L⁴, L⁵. This results in an increase in voltage across the terminals of field winding F and current will then flow momentarily from the positive line L⁴ through contacts 4ᵉ of switch 4 through the operating winding 5ª of relay 5 and through rectifier 7 in the direction of arrow $a$ to capacitor 8 until said capacitor is charged to the new voltage condition. As hereinbefore set forth, operating winding $5^b$ of relay 5 is normally connected across lines $L^4$—$L^5$ by contacts $4^d$ of switch 4 and relay 6 and upon momentary energization of operating winding $5^a$ relay 5 responds momentarily under the action of both of said windings to connect the operating winding $4^a$ of switch 4 to line $L^4$. However, it is necessary during starting of the motor to prevent connection of loading resistance R across lines $L^4$, $L^5$ by response of switch 4. For this purpose relay 6 is designed to respond to the starting current of the motor, the same being set to respond at a somewhat lower current value than relay 3. Relay 6, therefore, acts during starting of the motor to prevent energization of operating winding $4^a$ of switch 4 upon response of relay 5.

When motor M is accelerated to normal speed the current in the armature circuit drops sufficiently to permit opening of relay 3. Upon dropping out of relay 3 the current in field winding F is weakened to a degree determined by the setting of field rheostat FR and capacitor 8 discharges through rectifier 9 and resistance $r^2$ to line $L^4$ in the direction of arrow B until the charge thereof is reduced to a voltage value corresponding to the voltage drop between line $L^4$ and point X in the field circuit of the motor. With field rheostat FR set to provide for operation of motor M at a relatively high speed, relay 3 is likely to drop out and reclose before the motor is accelerated to the selected speed. This results in a repeat operation of relay 5. However, during the entire accelerating period of the motor relay 6 is maintained in open position to prevent energization of switch 4 upon reclosure of relay 5.

Assuming now that the motor is operating at a given speed and field rheostat FR is operated to weaken the field of the motor for an increased motor speed. Relay 3 is then likely to respond to shunt field rheostat FR and thus cause operation of relay 5 as hereinbefore set forth. However, when this occurs relay 6 also responds as hereinbefore set forth to prevent operation of switch 4 upon response of relay 5.

Assuming now that the motor is operating at a selected speed and that field rheostat FR is operated to strengthen the field of the motor for operation of the motor at a lower speed. Motor M will then operate as a generator, and as will now be set forth switch 4 is rendered responsive to connect loading resistance R across lines $L^4$, $L^5$ for absorption of the energy incident to generative operation of said motor. Upon quick strengthening of the field of the motor by rheostat FR, the voltage drop between line $L^4$ and point X in the field circuit of the motor is increased, and as hereinbefore set forth this results in momentary energization of winding $5^a$ of relay 5 by current in the direction of arrow $a$. Relay 5 then responds under the action of its windings $5^a$ and $5^b$ to connect the operating winding $4^a$ of switch 4 to line $L^4$. Relay 6 is now in closed position and will remain in such position as long as the generative condition exists. Thus upon response of relay 5, winding $4^a$ of switch 4 is connected across lines $L^4$, $L^5$ and said switch will respond to close its contacts $4^b$ for connection of loading resistance R across lines $L^4$, $L^5$. Also upon response of switch 4 contacts $4^d$ are opened to interrupt the energizing circuit for operating winding $5^b$ of relay 5 and contacts $4^e$ are opened to include resistance $r^1$ in the energizing circuit of winding $5^a$ of relay 5. This results in dropping out of relay 5 and said relay cannot reclose until switch 4 is returned to normal position. As hereinbefore set forth, capacitor 10 is normally connected across lines $L^4$, $L^5$ in series with resistance $r^4$ by contacts $4^c$ of switch 4 and said capacitor is thus normally charged to the voltage between lines $L^4$, $L^5$. Also as hereinbefore set forth, with relay 6 in closed position capacitor 10 is connected across the terminals of winding $4^a$ in series with resistances $r^4$ and $r^5$. Thus upon response of switch 4 capacitor 10 discharges through winding $4^a$ to delay dropping out of switch 4, upon opening of relay 5. Capacitor 10 acts to delay dropping out of switch 4 for a period sufficiently long to insure connection of the loading resistance across lines $L^4$—$L^5$ as long as the generative condition exists.

In connection with the foregoing it should be noted that due to the inductance of field winding F relay 5 responds without substantial delay upon quick operation of field rheostat FR to strengthen the field of the motor to thereby insure connection of loading resistance R across lines $L^4$, $L^5$ at the instant the motor M starts to generate. Also it should be noted that upon response of switch 4, resistance $r^1$ is included in the energizing circuit of winding $5^a$ to prevent repeat operations of relay 5 during generative operation of the motor. As is apparent, resistances $r^1$ and $r^2$ and rectifier 9 permit discharge of capacitor 8 to line $L^4$ in the direction of arrow $b$ so that the charge of said capacitor corresponds to the voltage drop between line $L^4$ and point X in the field circuit of the motor when switch 4 is returned to normal position.

What we claim as new and desire to secure by Letters Patent is:

1. In combination, a source of alternating current, a direct current circuit, rectifying means for supplying power from said source to said direct current circuit, a shunt motor connected across said direct current circuit and having an adjustable speed regulating resistance connected in the field circuit thereof, a loading device, and electroresponsive control means for connecting said loading device across said direct current circuit for a predetermined interval upon adjustment of said speed regulating resistance to effect rapid slowdown of said motor by generative operation thereof.

2. In combination, a source of alternating current, a direct current circuit, rectifying means for supplying power from said source to said direct current circuit, a shunt motor connected across said direct current circuit and having an adjustable speed regulating resistance connected in the field circuit thereof, a loading resistance, a control switch for connecting said loading resistance across said direct current circuit, and a relay for rendering said control switch operative to connect said loading resistance across said direct current circuit during generative operation of said motor, said relay having an operating winding connected across the terminals of the field winding of said motor, and means including a rectifier and a capacitor connected in series with said operating winding to render said relay momentarily responsive upon adjustment of said speed regulating resistance to effect rapid slowdown of said motor by generative operation thereof.

3. In combination, a source of alternating current, a direct current circuit, rectifying means for supplying power from said source to said direct current circuit, a shunt motor connected across said direct current circuit, an adjustable speed regulating resistance connected in the shunt field circuit of said motor, a series relay connected in the armature circuit of said motor for shunting said speed regulating resistance during acceleration of said motor, a loading resistance to be connected across said direct current circuit during generative operation of said motor, a relay having an operating winding connected across the terminals of the shunt field winding of said motor, means including a rectifier and a capacitor connected in the energizing circuit of the operating winding of said relay for rendering said relay momentarily responsive upon adjustment of said field rheostat to strengthen the field of said motor, and unresponsive upon adjustment of said speed regulating resistance to effect weakening of the field of said motor, a control switch rendered operative upon response of said relay to connect said loading resistance across said direct current circuit and means for rendering said control switch inoperative during acceleration of said motor.

4. The combination with a direct current motor of the shunt type and a current supply therefor including means requiring protection during generative operation of said motor, of an adjustable speed regulating resistance connected in the shunt field circuit of said motor, a loading device to be connected in shunt with said motor for protection of said means during generative operation of said motor, and electroresponsive control means for connecting said loading device in shunt with said motor, said control means being responsive directly to an increase in potential across the terminals of the shunt field winding of said motor upon rapid adjustment of said speed regulating resistance for slowdown of said motor.

5. The combination with a direct current motor of the shunt type and a current supply therefor including means requiring protection during generative operation of said motor, of an adjustable speed regulating resistance connected in the shunt field circuit of said motor, a loading device to be connected in shunt with said motor for protection of said means during generative operation of said motor, a relay responsive to a momentary increase in potential across the terminals of the shunt field winding of said motor incident to rapid adjustment of said speed regulating resistance for slowdown of said motor, and a control switch rendered responsive upon response of said relay to connect said loading device in shunt with said motor during slowdown thereof.

6. The combination with a direct current motor of the shunt type and a current supply therefor including means requiring protection during generative operation of said motor, of an adjustable speed regulating resistance connected in the shunt field circuit of said motor, a loading device to be connected in shunt with said motor for protection of said means during generative operation of said motor, a normally open relay for effecting momentary response of said relay upon an increase in voltage across the terminals of the shunt field winding of said motor incident to rapid adjustment of said speed regulating resistance for slowdown of said motor, a normally open electromagnetic control switch rendered responsive upon response of said relay to connect said loading resistance in shunt with said motor, and control means associated with said switch for delaying opening thereof for a predetermined interval upon dropping out of said relay.

7. The combination with a direct current motor of the shunt type and a current supply therefor including means requiring protection during generative operation of said motor, an adjustable speed regulating resistance connected in the shunt field circuit of said motor, a relay responsive to current in the armature circuit of said motor for shunting said speed regulating resistance during acceleration of said motor, a loading device, electroresponsive control means for connecting said loading device in shunt with said motor for a predetermined interval upon adjustment of said speed regulating resistance to effect slowdown of said motor, and means for rendering said electroresponsive control means inoperative upon shunting of said speed regulating resistance by said relay during acceleration of said motor.

ROBERT O. PERRINE.
WALTHER RICHTER.
EDWIN W. SEEGER.

REFERENCES CITED

The following references are of record in the file of this patent:

UNITED STATES PATENTS

| Number | Name | Date |
| --- | --- | --- |
| 2,331,103 | Borst | Oct. 5, 1943 |